(12) United States Patent
Le et al.

(10) Patent No.: US 11,939,438 B2
(45) Date of Patent: Mar. 26, 2024

(54) METHOD FOR IMPREGNATING REINFORCING FIBERS WITH POLYARYLETHERKETONES AND SEMI-FINISHED PRODUCTS OBTAINED IN THIS WAY

(71) Applicant: Arkema France, Colombes (FR)

(72) Inventors: Guillaume Le, Herouville Saint Clair (FR); Fabien Sguerra, Saint Laurent du Var (FR)

(73) Assignee: ARKEMA FRANCE, Colombes (FR)

(*) Notice: Subject to any disclaimer, the term of this patent is extended or adjusted under 35 U.S.C. 154(b) by 627 days.

(21) Appl. No.: 16/648,180

(22) PCT Filed: Sep. 13, 2018

(86) PCT No.: PCT/FR2018/052244
§ 371 (c)(1),
(2) Date: Mar. 17, 2020

(87) PCT Pub. No.: WO2019/053379
PCT Pub. Date: Mar. 21, 2019

(65) Prior Publication Data
US 2020/0262989 A1      Aug. 20, 2020

(30) Foreign Application Priority Data

Sep. 18, 2017 (FR) .................................... 1758625

(51) Int. Cl.
*C08J 5/10* (2006.01)
*B29B 11/16* (2006.01)
*C08J 5/04* (2006.01)
*C08J 5/24* (2006.01)
(Continued)

(52) U.S. Cl.
CPC ................. *C08J 5/10* (2013.01); *B29B 11/16* (2013.01); *C08J 5/042* (2013.01); *C08J 5/243* (2021.05);
(Continued)

(58) Field of Classification Search
CPC ...... B29B 11/16; B29B 15/12; C08J 2371/00; C08J 5/042; C08J 5/10; C08J 5/243;
(Continued)

(56) References Cited

U.S. PATENT DOCUMENTS

| 5,236,972 A | 8/1993 | Reinhart |
| 5,888,580 A * | 3/1999 | Hinrichsen ............. B29B 15/12 427/195 |

(Continued)

FOREIGN PATENT DOCUMENTS

| CN | 106280938 A | 1/2017 |
| DE | 4121915 A1 | 1/1993 |

(Continued)

OTHER PUBLICATIONS

Office Action (Notice of Reasons for Rejection) dated Sep. 5, 2022, by the Japanese Patent Office in corresponding Japanese Patent Application No. 2020-537056, and an English Translation of the Office Action. (11 pages).

(Continued)

*Primary Examiner* — Yan Lan
(74) *Attorney, Agent, or Firm* — Boone IP Law

(57) ABSTRACT

A process for preparing a semifinished product comprising a PAEK-based resin and reinforcing fibers, including: preparing a dispersion comprising a PAEK-based resin in pulverulent form dispersed in an aqueous phase including at least one volatile organic compound and optionally a surfactant; bringing the reinforcing fibers into contact with said aqueous dispersion; drying the fibers impregnated with dispersion; and heating the impregnated fibers to a temperature sufficient for the melting of the resin, so as to form a semifinished product, wherein the aqueous phase of the dispersion has a dynamic viscosity, measured at 25° C. under a shear stress of 6.8 $s^{-1}$ on a Brookfield DV2T Extra (Continued)

viscometer, is between 0.1 and 25 Pa·s; and wherein when the surfactant is present, its content is less than 1% by weight relative to the mass of dispersed resin.

13 Claims, 1 Drawing Sheet

(51) Int. Cl.
  *B29K 71/00* (2006.01)
  *B29K 105/00* (2006.01)
  *B29K 307/04* (2006.01)

(52) U.S. Cl.
  CPC ........... *C08J 5/249* (2021.05); *B29K 2071/00* (2013.01); *B29K 2105/0005* (2013.01); *B29K 2105/0094* (2013.01); *B29K 2307/04* (2013.01); *C08J 2371/00* (2013.01)

(58) Field of Classification Search
  CPC ............... C08J 5/249; B29K 2071/00; B29K 2105/0005; B29K 2105/0094; B29K 2105/251; B29K 2307/04
  See application file for complete search history.

(56) References Cited

U.S. PATENT DOCUMENTS

| | | |
|---|---|---|
| 2012/0148753 A1 | 6/2012 | Kubota et al. |
| 2016/0221223 A1 | 8/2016 | Pratte et al. |
| 2016/0264807 A1 | 9/2016 | Sagara et al. |
| 2017/0190836 A1* | 7/2017 | Griffin .................. C08G 65/48 |

FOREIGN PATENT DOCUMENTS

| | | |
|---|---|---|
| EP | 0455149 A2 | 11/1991 |
| EP | 2392550 A1 | 12/2011 |
| FR | 3034425 A1 | 10/2016 |
| JP | S64-79235 A | 3/1989 |
| JP | H04-012894 A | 1/1992 |
| JP | 2000-355629 A | 12/2000 |
| JP | 2005-238596 A | 9/2005 |
| JP | 2006-282743 A | 10/2006 |
| JP | 2008-044165 A | 2/2008 |
| JP | 2013-001891 A | 1/2013 |
| JP | 2016-210954 A | 12/2016 |
| JP | 2017-114942 A | 6/2017 |
| JP | 2019-508523 A | 3/2019 |
| WO | 8803468 A2 | 5/1988 |
| WO | 2017117087 A1 | 7/2017 |

OTHER PUBLICATIONS

International Search Report (with English Translation) and Written Opinion issued in corresponding International Patent Application No. PCT/FR2018/052244, 17 pages (dated Dec. 20, 2018).

Texier, A., et al., "Fabrication of Peek/carbon filbre composites by aqueous suspension prepregging," Polymer, Elsevier Science Publishers B.V, GB, vol. 34, No. 4, pp. 896-906, (Feb. 1, 1993).

Office Action (Notice of Reasons for Rejection) dated Mar. 27, 2023, by the Japanese Patent Office in corresponding Japanese Patent Application No. 2020-537056, and an English Translation of the Office Action. (9 pages).

* cited by examiner

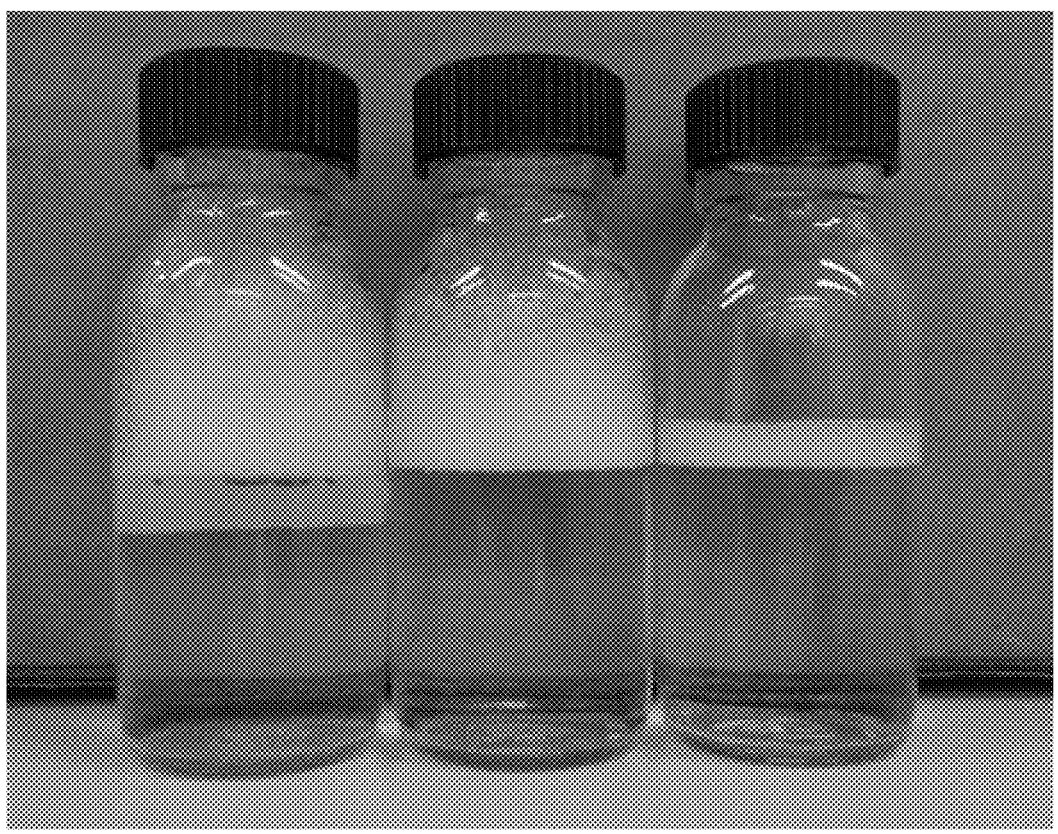

METHOD FOR IMPREGNATING REINFORCING FIBERS WITH POLYARYLETHERKETONES AND SEMI-FINISHED PRODUCTS OBTAINED IN THIS WAY

TECHNICAL FIELD

The present patent application relates to the field of the manufacture of semifinished products comprising a thermoplastic matrix and reinforcing fibers. It also relates to such semifinished products and to the use thereof in the manufacture of composite parts.

PRIOR ART

The composite materials combining a thermoplastic resin with reinforcing fibers are, due to their excellent mechanical properties for a low weight, of great interest in numerous fields, in particular in the aeronautical and space industry, but also in the motor vehicle industry and the sports equipment industry.

These composite materials are generally manufactured by consolidation of semifinished products consisting of resin-coated reinforcing fibers, such as prepregs in the form of unidirectional sheets, of rovings or of woven fabrics.

These semifinished products can be obtained by impregnation of the fibers by the resin. There are various processes, in which the resin can be molten, dissolved in a solvent, or else in powder form, either in a fluidized bed or dispersed in an aqueous solution. The impregnated fibers are subsequently, if appropriate, stripped of the solvent or of the aqueous solution and then heated in order to melt the retained resin and to form the semifinished product.

For polymers having a high melting point, such as poly(aryl ether ketone)s (PAEK), the impregnation in a bath of aqueous dispersion is advantageous economically and environmentally.

However, this process requires, in order to obtain an impregnation at the core of the fibers with resin, that a homogeneous distribution of the resin in the dispersion be provided.

Thus, the patent application WO 88/03468 proposes stabilizing the suspension by rendering it highly viscous (at least 50 Pa·s) and by further adding, if appropriate, a surfactant. The document furthermore proposes adding a minor amount of water-miscible organic liquid in order to accelerate the elimination of the aqueous medium after impregnation.

With a similar approach, the patent U.S. Pat. No. 5,236,972 proposes adding a water-soluble polymer, a wetting agent and, in addition, a biocide, a plasticizer and an antifoaming agent to the dispersion.

U.S. Pat. No. 5,888,580 proposes using, on the contrary, a low-viscosity dispersion containing little dispersant, and regulating the loading of the fibers with resin via the concentration of resin in the dispersion and the residence time. However, the composite parts manufactured from such semifinished products have a high porosity and nonoptimal mechanical properties.

In order to overcome this problem, application FR 3 034 425 proposes dispersing the thermoplastic resin by means of a specific alkoxylated alcohol surfactant, namely 100-times ethoxylated stearyl alcohol, and combining a stirring device in order to keep the suspension homogeneous. Thus, the authors claim to be able to consolidate composite products without porosities. Nevertheless, this invention does not resolve all the difficulties related to the viscosification of the resin, and can result in subsequent forming defects. This is because, in the molten state, the excessively viscous polymeric resin is no longer capable of flowing suitably. For this reason, it is difficult to achieve composite parts having the desired shape, the desired properties and the desired surface appearance.

In particular, it is common to observe the appearance of surface creasings and problems of strength of the welds produced during the assembling of the composite parts into complex parts. These defects are exacerbated when the consolidation is carried out at a pressure of less than 5 bar.

Generally, it is advantageous to be able to manufacture composite parts without resorting to a high pressure, since this requires the use of very expensive autoclaves.

The aim of the invention is to overcome these problems and to provide a process for preparing semifinished products capable of being converted into composite parts that do not exhibit the abovementioned defects.

Another aim of the invention is to provide a process for preparing semifinished products capable of being consolidated under low vacuum, outside an autoclave.

More specifically, it is an aim of the invention to provide such a process for preparing semifinished products in which the resin has a viscosity and a crystallinity which change little following the thermal cycles required for the manufacture of composite parts.

SUMMARY OF THE INVENTION

The abovementioned aims were achieved by a process according to the invention, in which the reinforcing fibers are impregnated in an aqueous dispersion of pulverulent PAEK resin comprising a minimal amount of surfactant.

Specifically, it was observed that it was possible to limit the amount of surfactants and/or of thickeners by adding water-miscible volatile organic compounds. Specifically, these compounds make it possible to increase the viscosity of the dispersion and to stabilize it. On the other hand, these compounds do not remain in the resin owing to their volatility.

It has furthermore been observed that these water-miscible volatile organic compounds may have an antifoaming effect, which makes it possible to further reduce the presence of additives such as antifoaming agents. Specifically, these additives may also be detrimental during the consolidation and may furthermore hamper the adhesion between the fiber and the matrix.

Specifically, the present invention is based on the observation that the quality of the composite parts based on PAEK resins depends in particular on the viscosity of the resin in the semifinished product and on its subsequent change. In point of fact, at the high temperatures necessary for the manufacture and the consolidation of PAEK-based semifinished products (temperatures generally above 300° C.), the compounds introduced during the process may decompose to give reactive entities, which may give rise to PAEK chain elongation reactions, including branchings. The increase in the molecular weight which results therefrom then increases the viscosity of the resin.

In point of fact, the systematic study of the various agents liable to be present in the PAEK-based semifinished product revealed, on the one hand, that the additives used in the dispersion constituted a main factor in the increase in the viscosity after a thermal cycle and, on the other hand, that this effect was very variable depending on the dosage thereof.

On this basis, it was able to be verified that that the use of a surfactant at low dosage makes it possible to limit the change in the viscosity of the resin and to obtain composite parts of required quality.

Without wishing to be committed to this hypothesis, it is assumed that many compounds, in particular organic compounds, decompose in the PAEK resin under the effect of the high temperature required to melt it. The reactive entities formed during the decomposition, in particular the radicals, may then react with the polymer and bring about chain elongation reactions, including branchings, which increase the molecular weight of the polymer and therefore also its viscosity. In point of fact, when the resin has a high viscosity, it is no longer able to thoroughly impregnate and to coat the fibers, to ensure good adhesion of the semifinished products with one another, nor to conform to the mold walls, which affects the quality of the composite products obtained. The presence of additives in the dispersion may furthermore also adversely affect the crystallization temperature and the degree of crystallinity of the resin, and therefore pose difficulties during the subsequent shaping and for the properties of the composite.

Consequently, according to a first aspect, a subject matter of the invention is a process for the preparation of a semifinished product comprising a PAEK-based resin and reinforcing fibers, comprising the stages of:
  a. preparing a dispersion comprising a PAEK-based resin in pulverulent form dispersed in an aqueous phase comprising at least one volatile organic compound and optionally a surfactant;
  b. bringing the reinforcing fibers into contact with said aqueous dispersion;
  c. drying the fibers impregnated with dispersion; and
  d. heating the impregnated fibers to a temperature sufficient for the melting of the resin, so as to form a semifinished product,
  characterized in that,
  the aqueous phase of the dispersion has a dynamic viscosity, measured at 25° C. under a shear stress of 6.8 s$^{-1}$ on a Brookfield DV2T Extra viscometer, is less than 25 Pa·s; and that
  when the surfactant is present, its content is less than 1% by weight relative to the mass of dispersed resin.

Preferably, the volatile organic compound is selected from alcohols, ketones, aldehydes, carboxylic acid esters, glycols and ethers, in particular an alcohol selected from methanol, ethanol, isopropanol, n-propanol, n-butanol, 2-butanol, tert-butanol, 1-methoxy-2-propanol, 1-ethoxy-2-propanol and mixtures thereof, a glycol selected from ethylene glycol, propylene glycol and mixtures thereof, a ketone such as acetone, an ether, a carboxylic acid ester selected from methyl acetate, ethyl acetate and propyl acetate and mixtures thereof.

Advantageously, the volatile organic compound forms an azeotrope with the water of the aqueous phase.

Preferably, the reinforcing fibers are carbon fibers.

The aqueous phase of the dispersion preferably has a dynamic viscosity, measured at 25° C. under a shear stress of 6.8 s$^{-1}$ on a Brookfield DV2T Extra viscometer, is of from 0.1 to 5, in particular from 0.300 to 3 and very particularly from 0.5 to 2 Pa·s.

The process of the invention is particularly useful when the PAEK resin is selected from the group consisting of poly(ether ketone) (PEK), poly(ether ketone) (PEEK), poly (ether ether ketone ketone) (PEEKK), poly(ether ether ketone ketone) (PEKK), poly(ether ketone ether ketone ketone) (PEKEKK), poly(ether ether ketone ether ketone) (PEEKEK), poly(ether ether ether ketone) (PEEEK) and poly(ether diphenyl ether ketone) (PEDEK), mixtures thereof and copolymers thereof with one another or with other members of the family of the PAEKs. In particular, the PAEK resin may be a PEKK having a weight percentage of terephthalic units relative to the sum of the terephthalic and isophthalic units of between 35% and 100%. Advantageously, the pulverulent PAEK resin in the dispersion has a median diameter D50 of from 1 to 300 μm, preferably from 5 to 100 μm and very particularly from 10 to 50 μm as measured according to the standard ISO 13 320.

Advantageously, the semifinished product prepared is selected from a prepreg or a tape.

Furthermore, according to a second aspect, one subject of the invention is a dispersion useful in the preparation of a semifinished product, comprising:
  a. 1%-50% by weight of PAEK-based resin having a number-average particle size of between 1 and 300 μm;
  b. 0-1% by weight, calculated relative to the weight of the resin, of at least one surfactant;
  c. 1%-50% by weight of at least one volatile organic compound;
  d. 0-1% by weight of other additives; and
  e. the remainder water,
  it being understood that the total of additives (c) and (d) in the aqueous phase represents less than 4% by weight of the dispersion.

Preferably, the dispersion of the invention comprises 15%-35% by weight of PAEK-based resin.

According to a third aspect, one subject of the invention is a semifinished product comprising a PAEK-based resin and reinforcing fibers, capable of being obtained by the process of the invention. Advantageously, the semifinished product is characterized in that the weight-average molecular weight Mw of the PAEK resin, as measured by size exclusion chromatographic analysis, does not increase by more than 100% after heat treatment at 375° C. for 20 minutes.

Finally, according to a fourth aspect, one subject of the invention is the use of a semifinished product as described above for the manufacture of composites.

BRIEF DESCRIPTION OF THE FIGURES

The invention will be better understood in light of the description which follows and the figure, which shows:
FIG. 1: The appearance of the dispersions according to examples 12 to 14 after vigorous stirring and standing for 5 minutes (left-hand side: dispersion according to comparative example 12, middle: dispersion according to example 13, right-hand side: dispersion according to example 14).

DESCRIPTION OF THE EMBODIMENTS

Definition of the Terms

The term "semifinished product" is intended to denote products comprising a resin and reinforcing fibers used as intermediate products in the manufacture of composite materials. These products can in particular be prepregs in the form of unidirectional sheets, of rovings or of woven fabrics, or else fiber/matrix mixtures.

The semifinished products can subsequently be assembled, for example by manual or automated drape forming or by automated fiber placement, and shaped by consolidation, for the manufacture of composite parts. The composite parts thus manufactured can be further converted, in order to obtain assemblages of complex composite parts. Thus, it is possible to co-consolidate composite parts, a process generally carried out in an autoclave by means of a fresh thermal cycle, or to weld parts to one another by local heating.

The term "resin" is intended to denote a composition predominantly comprising one or more polymers additivated, if appropriate, with conventional additives, in particular fillers and functional additives.

The term "dispersion" is intended to denote a heterogeneous composition comprising a liquid phase and a solid phase. In the dispersion employed in the process of the invention, the liquid phase is aqueous and contains a thermally stable surfactant and also other additives, if appropriate. The solid phase comprises or essentially consists of the PAEK resin in pulverulent form.

The term "surfactant" is intended to denote a compound having a hydrophilic part and a lipophilic part, and capable of dispersing the resin powder in the liquid phase and of keeping it in suspension in the presence or in the absence of stirring. This compound can also help in the wetting of the fibers by the dispersion.

The term "organic compound" is intended to denote a compound containing at least the element carbon and one or more of the following elements: hydrogen, halogens, oxygen, sulfur, phosphorus, silicon or nitrogen, with the exception of carbon oxides and carbonates and bicarbonates.

The term "volatile compound" is understood, in the context of this document, to mean a compound, of which the boiling point at atmospheric pressure is below 200° C., and preferably below 150° C., more preferably below 120° C. and very particularly below 100° C.

The Dispersion

The dispersion used in the proposed process comprises according to the invention an aqueous phase in which a PAEK resin in powder form is dispersed.

The PAEK resin essentially comprises at least one poly(aryl ether ketone) (PAEK). Poly(aryl ether ketone)s (PAEKs) comprise the units of following formulae:

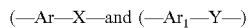

in which:

Ar and $Ar_1$ each denote a divalent aromatic radical;

Ar and $Ar_1$ may be preferably selected from 1,3-phenylene, 1,4-phenylene, 4,4'-biphenylene, 1,4-naphthylene, 1,5-naphthylene and 2,6-naphthylene, which are optionally substituted;

X denotes an electron-withdrawing group; it may preferably be selected from the carbonyl group and the sulfonyl group, Y denotes a group selected from an oxygen atom, a sulfur atom or an alkylene group, such as —$CH_2$— and isopropylidene.

In these X and Y units, at least 50%, preferably at least 70% and more particularly at least 80% of the X groups are a carbonyl group, and at least 50%, preferably at least 70% and more particularly at least 80% of the Y groups represent an oxygen atom. According to a preferred embodiment, 100% of the X groups denote a carbonyl group and 100% of the Y groups represent an oxygen atom.

More preferentially, the poly(arylene ether ketone) (PAEK) may be selected from:

a poly(ether ketone ketone), also referred to as PEKK, comprising units of formula IA, of formula IB, and the mixture thereof:

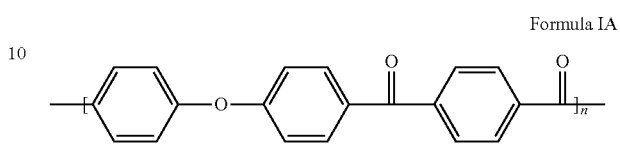

Formula IA

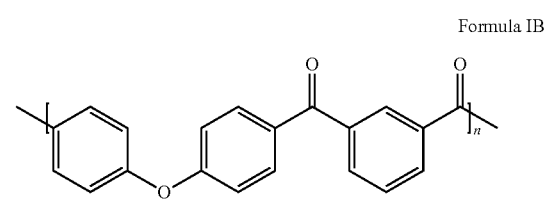

Formula IB a poly(ether ether ketone), also referred to as PEEK, comprising units of formula II:

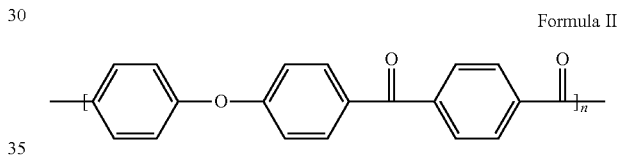

Formula II

The linkages may be completely para (Formula II). In the same way, it is possible to partially or completely introduce meta linkages into these structures at the ethers and the ketones, according to the two examples of the formulae III and IV below:

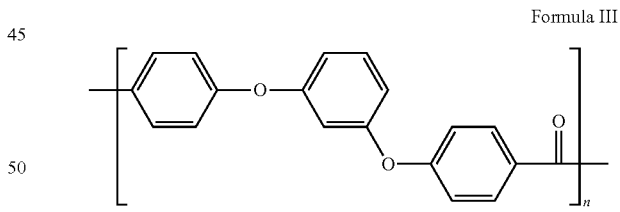

Formula III or else:

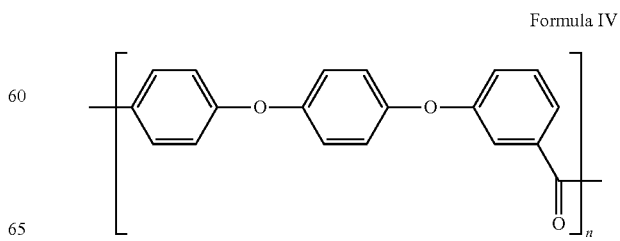

Formula IV or ortho linkages according to the formula V:

Formula V

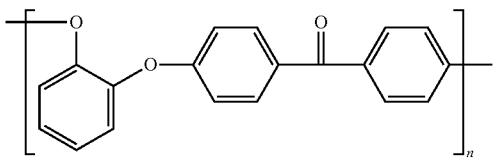

a poly(ether ketone), also referred to as PEK, comprising units of formula VI:

Formula VI

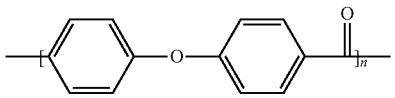

Similarly, the linkage may be completely para but it is possible to also partially or completely introduce meta linkages (formulae VII and VIII):

Formula VII

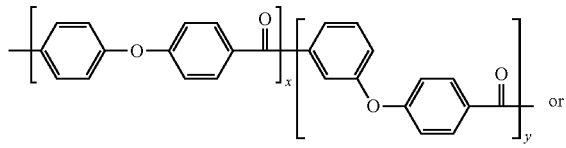

Formula VIII

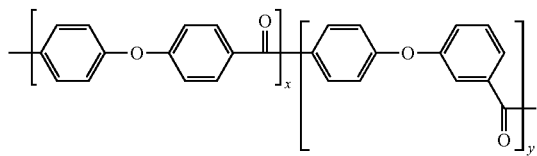

a poly(ether ether ketone ketone), also referred to as PEEKK, comprising units of formula IX:

Formula IX

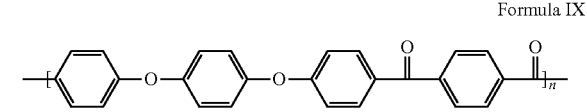

In the same way, it is possible to introduce meta linkages into these structures at the ethers and the ketones.

a poly(ether ether ether ketone), also referred to as PEEEK, comprising units of formula X:

Formula X

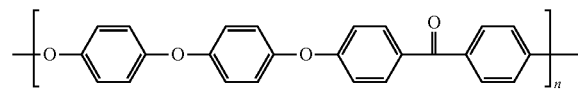

In the same way, it is possible to introduce meta linkages into these structures at the ethers and the ketones but also biphenol or diphenyl linkages according to the formula XI (units of D type in the next designations; the formula XI thus corresponds to the designation PEDEK):

Formula XI

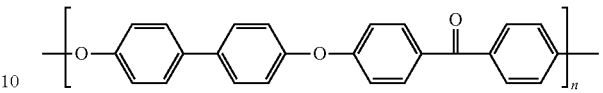

Other arrangements of the carbonyl group and of the oxygen atom are also possible.

Preferably, the PAEKs used in the invention are selected from the group consisting of poly(ether ketone) (PEK), poly(ether ketone) (PEEK), poly(ether ether ketone ketone) (PEEKK), poly(ether ether ketone ketone) (PEKK), poly(ether ketone ether ketone ketone) (PEKEKK), poly(ether ether ketone ether ketone) (PEEKEK), poly(ether ether ether ketone) (PEEEK) and poly(ether diphenyl ether ketone) (PEDEK), the mixtures thereof and the copolymers thereof with one another or with other members of the family of the PAEKs. PEEK and PEKK and also the mixtures thereof are particularly preferred.

Advantageously, the stability of the PAEK in the molten state can be improved by addition of one or more phosphates or phosphate salts.

Preferably, the PAEK resin comprises at least one poly(ether ketone ketone) (PEKK) which represents more than 50%, preferably more than 60%, in particular more than 70%, more preferably more than 80% and in particular more than 90% by weight of the resin, limit included. The remaining 10% to 50% by weight can consist of other polymers optionally belonging to the family of the PAEKs.

More preferably, the PAEK resin essentially consists of PEKK.

Advantageously, the PEKK has a weight percentage of terephthalic units relative to the sum of the terephthalic and isophthalic units of from 35% to 100%, in particular from 40% to 95%, more preferably from 50% to 90%, preferably from 60% to 80%, and very particularly this ratio is from 65% to 75%.

The resin may furthermore, as discussed above, additionally comprise other customary additives, such as fillers. Furthermore, the resin can optionally comprise minor amounts of functional additives. Preferably, the resin is nevertheless devoid of additives liable to decompose under the effect of heat, in order to limit the risk of change in the viscosity.

The particle size of the PAEK resin powder may have an impact on the stability of the suspension. It can also influence the quality of impregnation with resin of the reinforcing fibers. In order to ensure the optimal homogeneity of the suspension and good impregnation, it is preferred for the resin powder to be finely divided. More specifically, it is preferred for the PAEK powder to have a median diameter D50 is located in a range from 1 to 300 µm, preferably from 5 to 100 µm and very particularly from 10 to 50 pm, as measured according to the standard ISO 13 320.

Preferably, the content of PAEK resin powder of the dispersion is advantageously between 1% and 50%, preferably between 10% and 40% and very particularly from 25% to 35% by weight relative to the weight of the finished dispersion.

As mentioned above, the process according to the invention is characterized in that the dispersion furthermore comprises at least one surfactant.

As surfactant, it is possible to choose an ionic or nonionic surfactant. Preferably, it is an ionic surfactant and in particular an anionic surfactant.

According to a particularly preferred embodiment, the surfactant comprises a phosphate group. Indeed, the phosphates appear less inclined to react with the PAEK resins than other surfactants when they are used in the aqueous dispersion impregnation process.

More specifically, mention may in particular be made of surfactants from the family of ethoxylated alcohols such as ethoxylated alcohols and the monoesters or diesters thereof with phosphoric acid. The ethoxylated alcohols are in particular alcohols containing 6 to 24 and in particular 10 to 16 carbon atoms. Preferably, these are monoesters of phosphoric acid and ethoxylated alcohols. Alkyl ether phosphates and alkylaryl ether phosphates are particularly preferred.

Among these surfactants, preference will be given to those having a minimum of short alkyl oxide units, in particular $C_1$ to $C_3$ alkyl oxide units. Specifically, methylene oxide, ethylene oxide and propylene oxide units are particularly heat sensitive and capable of generating radicals.

It has in fact been demonstrated that a reduction in the content of short alkyl oxide units improves the quality of PEKK in consolidation in the molten state. Such a reduction can be obtained by controlling the amount of surfactant on the one hand and by choosing a surfactant with a low content of short alkyl oxide units on the other hand.

However, these alkyl oxide units are also particularly effective for ensuring a good dispersion of the PAEK powder. Thus, it is estimated that a content of 0.15%, preferably 0.20% and in particular 0.30% by weight of short alkyl oxide units relative to the weight of PAEK is particularly advantageous.

In terms of stability, preference will be given to surfactants having a low number of alkyl oxide units, notably less than 50, in particular from 5 to 40, and more preferably between 10 and 30.

Particularly preferred are the surfactants of the formula below:

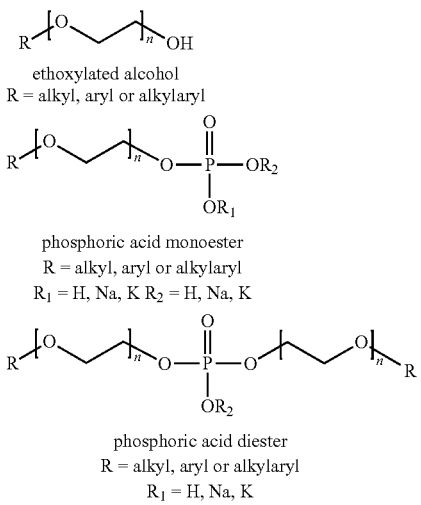

As mentioned above, the number of alkyl oxide units (number n) in these formulae is preferably less than 50, in particular from 5 to 40, and more preferably between 10 and 30.

Mention may in particular be made, as compounds of this family, of the surfactants sold under the name Lanphos PE35 by Lankem, Cecabase RT by Ceca France and Klearfac AA270 by DeWolf.

This surfactant can be used in the free acid form but it is preferably neutralized. The neutralization can be carried out beforehand or in situ in the dispersion by addition of an appropriate amount of sodium hydroxide or potassium hydroxide.

According to the invention, the dispersion comprises no more than 1%, preferably no more than 0.5%, in particular no more than 0.4%, and very particularly no more than 0.3% by weight of surfactant, calculated relative to the weight of resin to be dispersed.

It may be advantageous to add several surfactants. In particular, it is possible to choose one surfactant that makes it possible to ensure a good dispersion of the PAEK resin powder and another surfactant in order to improve the affinity of the reinforcing fibers with the PAEK resin powder.

According to a particular embodiment of the invention, the dispersion does not contain surfactant.

The aqueous phase of the dispersion can, if necessary, comprise minor amounts of other conventional additives, such as thickening agents, antifoaming agents or biocidal agents. In order to limit the presence of additives in the semifinished products and the associated potential problems, the dispersion nevertheless comprises a preferably minimal content of other additives. Preferably, however, the aqueous phase of the dispersion does not contain other conventional additives, in particular no thickening agents. Preferably, the amount of other additives will not exceed 4% by weight, in particular 3% and very particularly 2% by weight of the finished dispersion.

The aqueous phase of the dispersion consists predominantly of water. The aqueous phase of the dispersion comprises at least 60% by weight, preferably 70%, more preferably 80% and very particularly 90% by weight of water. The water used to prepare the dispersion is preferably a demineralized water.

According to the invention, the dispersion further comprises one or more volatile organic compounds. These compounds may be selected in particular from the families of alcohols, ketones, aldehydes, carboxylic acid esters, glycols and ethers.

Preferably, the volatile organic compound is an alcohol selected from ethanol, isopropanol, n-propanol, n-butanol, 2-butanol, tert-butanol, 1-methoxy-2-propanol, 1-ethoxy-2-propanol and mixtures thereof, a glycol selected from ethylene glycol, propylene glycol and mixtures thereof, a selected ketone such as acetone, an ether, a carboxylic acid ester selected from methyl acetate, ethyl acetate and propyl acetate and mixtures thereof.

Particularly preferred are the volatile organic compounds that form an azeotrope with water facilitating their elimination such as ethanol, methyl acetate, propyl acetate and mixtures thereof.

As already mentioned, it has been observed that the addition of such volatile organic compounds to the aqueous phase makes it possible to reduce or even eliminate the content of surfactant required to stabilize the PAEK resin in the dispersion, which makes it possible to limit the detrimental thermal degradations in the PAEK during the consolidation step. Furthermore, these compounds may make it possible to increase the viscosity of the dispersion by ensuring better wetting of the dispersed particles.

However, their volatility ensures that they do not remain in the resin, unlike customary non-volatile additives which then risk being decomposed to give reactive entities during the melting of the resin.

The aqueous phase of the dispersion preferably comprises at least 1% to 50%, in particular 5% to 40%, more preferably 10% to 30% and very particularly 15% to 25% by weight of one or more volatile compounds.

The dispersion obtained preferably has a dynamic viscosity, as measured at 25° C. under a shear stress of 6.8 s$^{-1}$ on a Brookfield DVT2T Extra viscometer, of from 0.1 Pa·s to 20 Pa·s, in particular from 0.1 to 5 Pa·s, in particular from 0.3 to 3 Pa·s and very particularly from 0.5 to 2 Pa·s.

The process for preparing the dispersion can be carried out in a manner known per se. More specifically, it is possible for example to prepare the dispersion by introducing, into a container of suitable volume provided with an appropriate stirring device, the required amount of water and by then subsequently adding the surfactant and also the other additive or additives, if appropriate. If necessary, the mixture is stirred until a homogeneous solution is obtained. The pulverulent PAEK resin is subsequently introduced into the aqueous solution and then stirring is carried out until a stable dispersion is obtained.

The Reinforcing Fibers

The reinforcing fibers may in principle be any fibers customarily used in the manufacture of semifinished products.

In accordance with the invention, the reinforcing fibers can be chosen from all fibers capable of being used as reinforcement in the manufacture of parts made of composite materials.

Thus, they can in particular be glass fibers, quartz fibers, carbon fibers, graphite fibers, silica fibers, metal fibers, such as steel fibers, aluminum fibers or boron fibers, ceramic fibers, such as silicon carbide or boron carbide fibers, synthetic organic fibers, such as aramid fibers or poly(p-phenylene benzobisoxazole) fibers, better known under the acronym PBO, or else PAEK fibers, or else mixtures of such fibers.

Preferably, they are carbon fibers or glass fibers, and more particularly carbon fibers.

According to a preferred embodiment, the fibers do not bring about, in combination with the other compounds, a significant change in the viscosity of the PAEK in the semifinished product and in the composite.

The fibers are preferably nonsized. When they are sized, the size is preferably suitable for the matrix, in particular in that it does not produce degradation products detrimental to the matrix.

The reinforcing fibers used in the manufacture of semi-finished products by impregnation by the aqueous dispersion route are generally continuous.

Preferably, they are provided in the form of unidirectional fibers, for example in the form of threads bringing together several thousand individual filaments (typically from 3000 to 48 000), measuring, for example, from 6 to 10 µm in diameter for the carbon fibers. Fibers of this type are known under the name of rovings.

Nevertheless, the fibers can also be arranged in a different way, for example in the mat form, or else in the form of textiles obtained by weaving of rovings.

The Process for Manufacturing the Semifinished Products

The manufacturing process according to the invention can be carried out conventionally, on the usual equipment, by employing the dispersion as described above. As indicated above, the presence in the dispersion of a surfactant at low dosage makes it possible to limit the formation of reactive entities capable of increasing the molecular weight of the resin and hence its viscosity, and thereby to reduce the appearance of defects in the composite parts.

More specifically, the semifinished products are obtained by introduction of the reinforcing fibers into and circulation of the reinforcing fibers in a bath of aqueous dispersion as described above. The fibers impregnated with PAEK resin are subsequently removed from the bath and stripped of the water, for example by drying in an infrared oven. The dried impregnated fibers are subsequently heated until the resin has melted, in order to enable the coating of the fibers by the PAEK resin. The coated fibers obtained are subsequently, if appropriate, shaped, for example by calendering. This step may make it possible to texture and ensure the proportioning of the semi-finished product.

Preferably, the semifinished products according to the invention comprise from 1% to 99% by weight, preferably from 30% to 90% by weight, in particular from 50% to 80% by weight and in particular from 60% to 70% by weight of reinforcing fibers.

Advantageously, these semifinished products are characterized in that the weight-average molecular weight $M_W$ of the PAEK resin, as measured by size exclusion chromatographic analysis, does not increase by more than 100% after heat treatment at 375° C. for 20 minutes in air.

The semifinished products obtained according to the process of the invention can be used in particular in the manufacture of composite parts.

The composite parts are obtained, for example, by manufacturing first a preform, in particular by placing or drape forming the pre-impregnated semifinished products in a mold. The composite part is then obtained by consolidation, during which step the preform is heated, generally under pressure in an autoclave, so as to assemble the semi-finished products by melting. Preferably, the semifinished products manufactured according to the invention can be consolidated outside an autoclave, for example in a vacuum bag placed in an oven.

The semifinished products manufactured according to the process of the invention are characterized in particular by a resin, the viscosity of which has changed little despite the high temperatures required for their manufacture in order to melt the resin.

In the processes for manufacturing composite parts, the semifinished products are subjected to various thermal cycles, under pressure or under vacuum, in order to assemble them together in order to form the composite part and/or to shape it.

The composite products manufactured according to the process of the invention are characterized in particular by a resin, the viscosity of which has changed little despite the high temperatures required for their manufacture.

During these steps, a not excessively high viscosity of the matrix is essential in order to ensure that the semifinished products indeed adopt the shapes of the mold. The viscosity of the matrix also makes it possible to ensure a good flow during the consolidation and to thus prevent the surface defects, such as creasings.

The invention will be explained in more detail in the examples which follow.

EXAMPLES

Examples 1 to 9

Change in the Crystallization Temperature Depending on the Surfactant Dosage

The impact of the thermal cycle on a PEKK resin (KEPSTAN 7002 sold by Arkema France) was studied for variable dosages of various surfactants by measuring the crystallization temperature. Like the viscosity, the crystallization temperature is adversely affected by elongation reactions including branching reactions. Specifically, when the average molecular weight of the polymer increases, the viscosity increases and the crystallization temperature decreases.

The following surfactants were studied:
Brij S 100, sold by Sigma Aldrich: Polyethylene glycol (100) monooctadecyl ether
Lanphos PE35, sold by Lankem: monoester of phosphoric acid and C13 alcohol
Neutralised Lanphos PE35: Lanphos PE35 neutralized by addition of sodium hydroxide solution according to the following protocol:
Preparation of an aqueous solution of PE35 Na at 1 wt %
Lamphos PE35 (1 g) and a 1 mol/l NaOH solution (1.3 g) are introduced into a beaker, topped up with distilled water (97.7g) and the mixture is vigorously stirred for 10 minutes until a clear solution is obtained. The amount of 1M NaOH solution corresponds to 0.95 equivalent of sodium hydroxide (determined by acid-base titration of an aqueous solution of PE 35).

PEKK samples impregnated with these surfactants were prepared as follows:

An aqueous solution of X% by weight of surfactant is prepared by introducing (1000-X) g of water and also X g of the surfactant into a flask. The aqueous solution is homogenized for 10 minutes using a mill homogenizer.

Next, 3 g of PEKK powder (sold under the name Kepstan 7002PT by Arkema France, D50=20 μm) are introduced into (3×X) g of 1% by weight solution of surfactant prepared in a 250 ml single-neck round-bottomed flask so that the surfactant/PEKK weight ratio is X%). 10 ml of distilled water are then added and the mixture is stirred vigorously for 10 minutes using a magnetic stirrer. Finally, the water is evaporated from the dispersion obtained using a rotary evaporator and the powder is dried under vacuum at 120° C. for 2 h in order to recover a surfactant-impregnated PEKK powder.

By way of example, for example 3:
3 g of PEKK
3×0.8=2.4 g of 1% by weight aqueous solution of Brij S100
10 g of distilled water The crystallization temperature of the PEKK is measured by scanning calorimetry (DSC) after a thermal cycle during which the sample of surfactant-impregnated powder is heated at 380° C. for 30 minutes under nitrogen.

The results in table 1 below reveal a significant decrease in the crystallization temperature after thermal cycle for all the samples. It can reasonably be assumed that the viscosity of the resin increases in the same proportion, causing difficulties in processing the semifinished product obtained. Furthermore, for a given surfactant, the crystallization temperature after thermal cycle decreases markedly more when the dosage increases, for the contents examined between 0.25% and 1.25% by weight.

TABLE 1

Crystallization temperature of surfactant-impregnated PEKK

| | Surfactant | Dosage* (% by weight relative to the weight of PEKK) | EO units (% by weight relative to the weight of PEKK) | $T_{cryst}$ after thermal cycle (° C.) |
|---|---|---|---|---|
| REF | — | 0 | 0 | 269 |
| 1 | Brij S100 | 0.27 | 0.25 | 264 |
| 2 | Brij S100 | 0.53 | 0.5 | 248 |
| 3 | Brij S100 | 0.8 | 0.75 | 250 |
| 4 | Lanphos PE35 | 0.58 | 0.26 | 258 |
| 5 | Lanphos PE35 | 1.16 | 0.51 | 256 |
| 6 | Lanphos PE35 | 1.74 | 0.77 | 239 |
| 7 | Lanphos PE35 neutralized with NaOH | 0.57 | 0.25 | 268 |
| 8 | Lanphos PE35 neutralized with NaOH | 1.14 | 0.49 | 265 |
| 9 | Lanphos PE35 neutralized with NaOH | 1.70 | 0.73 | 258 |

*mass of surfactant/mass of PEKK

Finally, it is noted that at equal dosage, the effect on the crystallization temperature depends on the surfactant chosen: the Lanphos PE35 surfactant causes a very moderate decrease while the decrease is very marked for the Brij 5100 surfactant which has a high weight proportion of ethylene oxide.

In view of these results, it therefore appears advantageous to choose a suitable surfactant and to use a low dosage of surfactant.

Example 10

Effect of a Volatile Organic Compound on the Stability of the Dispersion

When the amount of surfactant is reduced beyond a certain threshold, the dispersion can no longer be stabilized properly, which may cause difficulties during the manufacture of semifinished products such as prepregs.

However, it has been observed that the addition of certain volatile organic compounds such as alcohols makes it possible to reduce, or even eliminate, the dosage of surfactant required to stabilize a dispersion of PAEK powder in an aqueous medium.

In order to study this effect in more detail, aqueous dispersions were prepared containing 33% by weight of PEKK powder and variable contents of surfactant and isopropanol. The preparation protocol is explained below for a dispersion containing 30% by weight of isopropanol relative to the aqueous phase and 1% by weight of surfactant, relative to the weight of PEKK.

6 g of PEKK (Kepstan 7002PT sold by Arkema France, D50=20 μm) are introduced into a suitable container equipped with a stirring means, and X g of surfactant is added (X being such that the surfactant/PEKK weight ratio=X%). Then, 12 g of a water/isopropanol (100-n/n (n being the percentage of isopropanol, n=0–30) mixture is added to the solution and the dispersion obtained is stirred vigorously for 30 minutes using a magnetic stirrer. The mixtures thus produced are then dried for 12 hours under vacuum at 120° C.

Each dispersion prepared is then judged in terms of its stability 60 minutes after its preparation. The dispersion is considered to be:

stable (+) when the PEKK is perfectly dispersed in the solution,
fairly stable (o) when the PEKK is well dispersed but is deposited a little on the walls, and
inhomogeneous (−) when the PEKK is not completely dispersed.

The composition and the stability of the various dispersions produced are collated in table 2 below.

TABLE 2

Stability of PEKK powder dispersions

| X: Surfactant content (in % by weight relative to the weight of PEKK) | n: Isopropanol content (in % by weight of the liquid phase) | | | | |
|---|---|---|---|---|---|
| | 30 | 25 | 20 | 10 | 0 |
| 1 | + | + | + | + | + |
| 0.5 | + | + | + | + | + |
| 0.25 | + | + | + | + | o |
| 0.1 | + | + | o | o | − |
| 0 | o | o | o | o | − |

The series of tests was repeated using tert-butanol as the alcohol, with equivalent results.

These results demonstrate that a portion, or even all, of the surfactant can be replaced by an alcohol such as isopropanol or tert-butanol as dispersant of the PEKK powder.

Example 11

Effect of a Thickening Agent on the Crystallization Temperature

The impact of the presence of thickening agents on the change in the crystallization temperature after thermal cycle was studied as follows.

A PEKK powder impregnated in a 0.1% by weight solution of surfactant was prepared as indicated in example 1, but by also adding 6% by weight of polyacrylic acid sodium salt to the surfactant solution.

The dispersion is very thick (viscosity of around 10 Pa·s) and must be degassed before use due to the presence of numerous bubbles.

The PEKK powder impregnated with surfactant and thickening agent also has very low thermal stability. Specifically, after having undergone the thermal cycle mentioned in example 1, the sample has a much lower crystallization temperature than an equivalent sample prepared with a surfactant content of 1% by weight.

It is thus observed that the thickening agent can be as harmful as a surfactant, or even more so, for a PAEK resin exposed to high temperatures.

With a view to preparing semifinished products that have good behavior in the subsequent transformation into composite materials, it is therefore preferable to use baths of aqueous dispersion of PAEK powder devoid of thickening agent.

Examples 12-21

Viscosity Adjustment

In order to study the effect of the volatile organic compound on the viscosity of the aqueous phase of the dispersion, dispersions with variable contents of surfactant and isopropanol were prepared, according to the protocol indicated in example 10.

The dynamic viscosity of the dispersions was measured at 25° C. on a Brookfield DV2T Extra viscometer under a shear stress of 6.8 s$^{-1}$.

The results are collated in Table 3 below.

TABLE 3

Dynamic viscosity as a function of the content of surfactant and isopropanol

| Ex. | Surfactant content (% by weight relative to the weight of PEKK) | Isopropanol content (% by weight relative to the weight of liquid phase) | Dynamic viscosity (mPa · s) |
|---|---|---|---|
| 12* | 1 | 0 | 60 |
| 13 | 1 | 10 | 151 |
| 14 | 1 | 20 | 248 |
| 15 | 1 | 25 | 400 |
| 16 | 1 | 30 | 944 |
| 17 | 0 | 10 | 737 |
| 18 | 0.1 | 10 | 669 |
| 19 | 0.25 | 10 | 513 |
| 20 | 0.5 | 10 | 191 |
| 21 | 1 | 10 | 151 |

*comparative example

The results demonstrate that a suitable choice of the content of surfactant and of isopropanol makes it possible to vary the viscosity of the aqueous phase of the dispersion over a wide range.

In the case illustrated, it is thus possible to adjust the viscosity between 60 and 1000 mPa·s by acting on these two parameters.

Example 22

Antifoaming Effect of Alcohol in the Dispersion

In order to study the antifoaming effect of the volatile organic compound in the aqueous surfactant solution, the dispersions of examples 12 to 14 were stirred vigorously for 3 minutes. After having left the dispersions to stand for 5 minutes, the appearance of the dispersions was photographed (see FIG. 1).

It is observed that the solution in the right-hand container (20% by weight of isopropanol) has significantly less foam than the left-hand container (0% by weight of isopropanol) or that of the middle container (10% by weight of isopropanol). In this mixture, the isopropanol therefore acts as an antifoaming agent.

In the presence of PEKK powder, this effect is even more marked, since 10% by weight of isopropanol is sufficient to obtain a satisfactory antifoaming effect.

An alcohol added to the aqueous phase of PAEK powder dispersions can therefore also act as an effective antifoaming agent, and thus avoid the addition of a supplementary additive.

It is found, from all of the studies given above, that the dosage of the surfactant constitutes an essential factor concerning the change in the viscosity of a PAEK resin subjected to a thermal cycle representative of that required for the consolidation of a semifinished product to give composite parts. Furthermore, the above examples demonstrate the advantage of adding an alcohol to the aqueous phase of the dispersion. Specifically, this may have a triple function: to partially compensate for the omitted surfactant, to adjust the viscosity without adding a thickening agent, and to replace a possible antifoaming agent.

The use of a surfactant at low dosage, optionally coupled with an alcohol, and the removal of other additives as far as possible in the PAEK dispersion used during the manufacture of semifinished products according to the process of the invention therefore makes it possible, by preserving the viscosity of the PAEK resin, to ensure a good quality of the composite parts obtained from these semifinished products.

Lists of the Documents Cited

WO 88/03468
U.S. Pat. No. 5,236,972
U.S. Pat. No. 5,888,580
FR 3 034 425

The invention claimed is:

1. A process for preparing a semifinished product comprising a PAEK-based resin and reinforcing fibers, comprising the steps of:
   a. preparing a dispersion comprising a PAEK-based resin in pulverulent form dispersed in an aqueous phase comprising 1%-40% by weight at least one volatile organic compound and a surfactant;
   b. bringing the reinforcing fibers into contact with said aqueous dispersion;
   c. drying the fibers impregnated with dispersion; and
   d. heating the impregnated fibers to a temperature sufficient for the melting of the resin, so as to form a semifinished product,
   wherein the dispersion has a dynamic viscosity, measured at 25° C. under a shear stress of 6.8 $s^{-1}$ on a Brookfield DV2T Extra viscometer, is between 0.1 and 25 Pa·s; and
wherein the surfactant is present, and its content is less than 1% by weight relative to the mass of dispersed resin.

2. The preparation process as claimed in claim 1, wherein the volatile organic compound is selected from alcohols, ketones, aldehydes, carboxylic acid esters, glycols and ethers.

3. The preparation process as claimed in claim 1, wherein the volatile organic compound is an alcohol selected from methanol, ethanol, isopropanol, n-propanol, n-butanol, 2-butanol, tert-butanol, 1-methoxy-2-propanol, 1-ethoxy-2-propanol and mixtures thereof, a glycol selected from ethylene glycol, propylene glycol and mixtures thereof, a ketone such as acetone, an ether, a carboxylic acid ester selected from methyl acetate, ethyl acetate and propyl acetate and mixtures thereof.

4. The preparation process as claimed in claim 1, wherein the volatile organic compound forms an azeotrope with the water of the aqueous phase.

5. The preparation process as claimed in claim 1, wherein the reinforcing fibers are carbon fibers.

6. The preparation process as claimed in claim 1, wherein the dispersion has a dynamic viscosity, measured at 25° C. under a shear stress of 6.8 $s^{-1}$ on a Brookfield DV2T Extra viscometer, of from 0.1 to 5, Pa·s.

7. The preparation process as claimed in claim 1, wherein the PAEK resin is selected from the group consisting of poly(ether ketone) (PEK), poly(ether ether ketone) (PEEK), poly(ether ether ketone ketone) (PEEKK), poly(ether ether ketone ketone) (PEKK), poly(ether ketone ether ketone ketone) (PEKEKK), poly(ether ether ketone ether ketone) (PEEKEK), poly(ether ether ether ketone) (PEEEK) and poly(ether diphenyl ether ketone) (PEDEK), mixtures thereof and copolymers thereof with one another or with other members of the family of the PAEKs.

8. The preparation process as claimed in claim 1, wherein the PAEK resin is a PEKK having a weight percentage of terephthalic units relative to the sum of the terephthalic and isophthalic units of between 35% and 100%.

9. The preparation process as claimed in claim 1, wherein the pulverulent PAEK resin in the dispersion has a median diameter D50 of from 1 to 300 μm as measured according to the standard ISO 13 320.

10. The preparation process as claimed in claim 1, wherein the semifinished product is selected from a prepreg or a tape.

11. A semifinished product comprising a PAEK-based resin and reinforcing fibers, capable of being obtained by the process as defined in claim 1.

12. The semifinished product as claimed in claim 11, wherein the weight-average molecular weight $M_w$ of the PAEK resin, as measured by size exclusion chromatographic analysis, does not increase by more than 100% after heat treatment at 375° C. for 20 minutes.

13. A method of manufacturing a composite material, the method comprising using semifinished product as claimed in claim 11 for the manufacture of composite materials.

* * * * *